United States Patent [19]
Brisson

[11] Patent Number: 5,487,147
[45] Date of Patent: Jan. 23, 1996

[54] GENERATION OF ERROR MESSAGES AND ERROR RECOVERY FOR AN LL(1) PARSER

[75] Inventor: James P. Brisson, Wappingers Falls, N.Y.

[73] Assignee: International Business Machines Corporation, Armonk, N.Y.

[21] Appl. No.: 755,270

[22] Filed: Sep. 5, 1991

[51] Int. Cl.$^6$ .................................................. G06F 17/27
[52] U.S. Cl. ........................ 395/180; 364/419.08
[58] Field of Search ................ 395/575; 364/280.4, 364/419.08

[56] References Cited

U.S. PATENT DOCUMENTS

| | | | |
|---|---|---|---|
| 4,686,623 | 8/1987 | Wallace | 364/300 |
| 4,698,784 | 10/1987 | Abell | 364/900 |
| 4,729,096 | 3/1988 | Larson | 364/300 |
| 4,829,423 | 5/1989 | Tennant | 364/200 |
| 4,864,501 | 9/1989 | Kucera | 364/419 |
| 4,868,750 | 9/1989 | Kucera | 364/419 |
| 4,905,138 | 2/1990 | Bourne | 364/200 |
| 4,931,935 | 6/1990 | Ohira | 364/419 |
| 4,989,145 | 1/1991 | Kyushima | 364/419 |
| 4,994,966 | 2/1991 | Hutchins | 364/419 |
| 5,060,155 | 10/1991 | van Zuijlen | 364/419 |
| 5,068,789 | 11/1991 | van Vliembergen | 364/419 |
| 5,105,353 | 4/1992 | Charles | 395/700 |

OTHER PUBLICATIONS

Sippu et al., A Syntax–Error–Handling Technique and Its Experimental Analysis, ACM Transactions on Programming Languages & Systems, vol. 5, No. 4, Oct. 1983, pp. 656–679.

Spenke et al., A Language Independent Error Recovery Method for LL(1) Parsers, Software–Practice & Experience, vol. 14(11), Nov. 1984, pp. 1095–1107.

Crookes et al., Building Syntax Graphs from Syntax Equations: A Case Study in Modular Programming, Software–Practice & Experience, vol. 13(12), Dec. 1983, pp. 1129–1139.

*Primary Examiner*—Robert W. Beausoliel, Jr.
*Assistant Examiner*—Glenn Snyder
*Attorney, Agent, or Firm*—Lawrence D. Cutter; Blanche E. Schiller; JoAnn Kealy Crockatt

[57] ABSTRACT

The syntactic definition of a grammar for language statements is the basis for a method for automatically generating error messages and error recovery for the language statements. The grammar is used to produce a parser, an error message generator, and error recovery for the language statements. The error message generator is produced automatically along with a parser and provides an indication of alternative valid input symbols. The method also produces the automatic generation of expected symbols lists to achieve error message generation goals. The error recovery routines are also produced automatically along with a parser and provide an indication of where valid parsing continues in the event of error detection in the language statements. The method also uses the dynamic generation of sets of synchronization symbols to achieve error recovery goals.

3 Claims, 7 Drawing Sheets

GENERATION OF ERROR MESSAGES AND ERROR RECOVERY FOR AN LL(1) PARSER

BACKGROUND OF THE INVENTION

The present invention is generally related to the analysis of syntactical expressions and the generation of a mechanism which is capable of generating error messages associated with supplied syntactical expressions. More particularly, the present invention is related to a method for producing program mechanisms:

1. which generate error messages associated with a supplied set of syntactical expressions; and
2. which provide recovery from errors that violate a supplied set of syntactical expressions.

An understanding of the present invention is perhaps best understood by first considering the normal operation of computer software programs referred to as "compilers". Compilers accept statements in a given language whose syntax is specified, and in response thereto they generate sequences of code structures. In particular, when a string of symbols from the language is supplied to the compiler and is subsequently recognized by the compiler, the output is often a list of code structures which are produced in response to the compiler having parsed the supplied input sequence from the specified language in accordance with syntax which defines the language. In accordance with the rules of the language, the compiler operates to parse the words and phrases supplied and in doing so effectively traverses a tree structure through the operation of pushing and popping various syntactical elements to and from a computer stack structure implemented in the memory of the machine on which the compiler is running. When a terminal node of a syntactical tree is reached, nonterminal elements of the syntax are replaced by terminal elements. When such a tree node is reached, the particular expression being presented to the compiler is said to have been parsed successfully and it is then possible to associate the list of syntactical expressions in accordance with the implemented language to be associated with an appropriate set of code structures which can be run on a machine for which the compiler output is designed (the target machine). Alternatively, the output of the compiler might also comprise a sequence of code structures which are construed as pseudo-code or so-called P-level code which may be relatively easily ported across a number of different hardware machine environments.

However, there are times during the compilation process when incorrect sequences are presented to the compiler. That is to say, it is possible to present to the compiler sequences of expressions which are not grammatically correct in terms of the defined syntax which the compiler is meant to implement. When this occurs, the compiler issues an error message describing the nature of the syntactical error. Furthermore, it is often the case that the occurrence of the error results in the inability of the compiler to proceed in parsing the remaining stream of input characters representing expressions and phrases from the intended grammar. For example, those who are familiar with the programming arts and/or those who have written programs in any of a large number of different computer languages are well aware of compiler generated error messages such as "the highlighted word is not a valid variable name".

In the present invention, systems' designers supply to an embodiment of the present invention a string of symbols which define the syntax for the language which is meant to be implemented. Typically, in the present invention operating system code designers supply syntactical expressions to the invention's code generator. These expressions typically describe appropriate command line formats which are to be recognized and translated into a sequence of code structures which are to be performed by the computer operating system. It is the command syntax that is typically provided to a software embodiment of the present invention. These syntactical expressions are used to create code generators which accept expressions from the language implemented (to be distinguished from syntax expressions which define the language itself). In a certain sense then the present invention is somewhat similar to a compiler compiler or a compiler generator. From syntactical definitions provided by the user, the present invention generates code which in turn accepts command line sequences and produces actual output code or output pseudo-code.

SUMMARY OF THE INVENTION

The present invention is directed to one level of abstraction beyond that which has been discussed so far. In particular, in the present invention systems' designers supply to an embodiment of the present invention a string of symbols which define the syntax for the language which is meant to be implemented. From syntactical definitions provided by the user (the designer), the present invention generates code which produces actual output code or output pseudo-code which in turn:

1. accepts and parses command line sequences,
2. automatically produces error messages, and
3. automatically recovers from the error in order to resume parsing.

Moreover, the present invention goes beyond the generation of compiler code from a supplied syntax, and extends to the generation of code which produces error messages and error recovery associated with the parsing of incorrect language command sequences.

1. Accordingly, the present invention also operates to produce code which produces error messages.

Moreover, these error messages are the preferred ones which would logically be associated with the attempted parsing of command sequences which are not in conformance with the grammar.

2. The present invention includes error recovery methods which are also automatically entered into as a result of the detection of incorrect language command sequences.

These error recovery methods determine the first possible position where parsing of the command sequences can resume.

Thus, the invention frees the developers of computer languages from the task of separately having to write and/or produce code which links the production of error messages with the occurrence of recognized syntactical errors as specified by the given syntax statements. Furthermore, the present invention includes error recovery methods which are also automatically entered into as a result of the detection of syntax errors.

In summary then, it is seen that the present invention has provided a method for the automatic production of error message composers and error recovery routines associated with supplied syntactical language definitions. In the most immediate applications of the invention, these principles are applied to the generation of error message generators for operating system command line syntax analyzers, and also to the generation of error recovery routines which determine where syntax checking (or parsing) can successfully continue.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DESCRIPTION OF THE PREFERRED EMBODIMENT

Introduction/Overview

Figure 1:
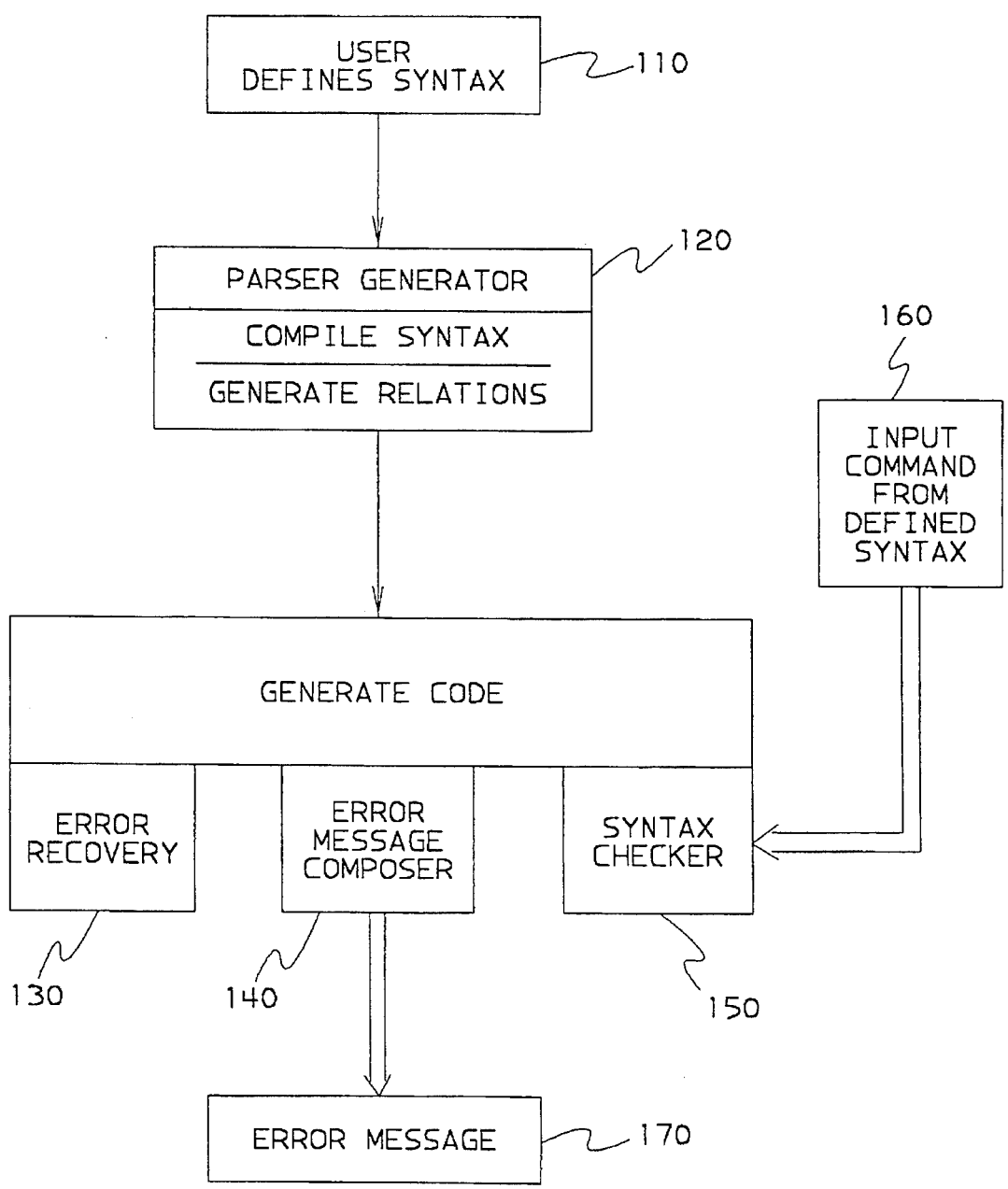
FIG. 1 is a diagram illustrating the environment in which the operating system designers and/or developers provide a set of grammar rules to a parser generator to trigger the generation code structures containing the syntax checker, error message composer, and error recovery routines.

For the purposes of better understanding the method and operation of the present invention, it is best to consider that, at different times, there are typically different users of the invention. The initial user of the invention is often an operating system designer who is designing command line syntax for the purpose of providing operating system utility and other functionality to end users in response to commands entered by them, either at a terminal screen in an interactive mode or otherwise in batch modes of operation. The operating system command designer thus provides the appropriate command syntax to program mechanism embodiments of the present invention running on a digital computer. Subsequent users of the invention provide command line statements themselves, and in response thereto, linked code structures operate to control digital computational devices to move files, transfer data, etc.

If the command line syntax is not in accordance with the specified grammar, the error message composer of the present invention operates to produce messages via code which is automatically generated without the immediate necessity for code authorship by the operating system command designer. The error recovery methods of applicant's invention operate to permit syntax checking (parsing) to resume via code which is also automatically generated without the immediate necessity for code authorship by the operating system command designer. This provides a significant advantage and an increased level of efficiency for operating system code developers and also provides a significantly improved degree of accuracy, consistency and effectiveness in error message generation and in automated error recovery.

In particular, the present invention provides a method for checking syntax in the command structure associated with the MVS Operating System designed for use in hardware environments marketed and sold by the assignee of the present invention. In addition to checking the syntax for MVS operating system commands, syntax checking is also usefully provided for the parsing of parameter list (PARM-LIB) library members. The syntax is supplied in accordance with the present method by operating system developers who specify the desired syntax in an appropriate format, typically in a form similar to the well known Backus-Naur Form (BNF). Thus a significant benefit is that the operating system designer is freed from the necessity of developing code that:

1. identifies all the situations that require error messages;
2. produces accurate, understandable, meaningful, and consistent error messages; and
3. provides intelligent recovery (resumption of parsing) when syntax errors are detected.

These messages are in fact produced in response to a syntax error recognized by code which is generated in accordance with the present invention. Accordingly, the present invention significantly extends the range, scope and utility of so-called compiler generators, error message composers, and error recovery routines, to significantly ease the burden on operating system designers and compiler writers.

FIG. 1 provides an overview of the present invention. This invention is directed to parser generator 120 which generates code for three execution time components which strictly enforce grammar rules that are input to parser generator 120, and uses these grammar rules to produce error messages and achieve error recovery. The parser generator 120 is an LL(1) based parser general or that produces, at "first compile" time, code which at execution time detects (block 150) syntax errors, produces messages that describe errors (block 140), and recovers (block 130) from the errors to continue parsing.

The designers or developers of an application define (block 110) the grammar rules to describe the syntax of external interfaces to their function. An example of such external interfaces is an operating system command and its parameters, or an expression of the parameters in a PARM-LIB member that represent the set of potential policy supported by the function. (PARMLIB is a dataset generally maintained on a DASD storage device. The dataset is at least partially constructed in accordance with system users' design, and supplies parameters to the operating system to create a specified environment and throughput level.)

The parser generator 120 compiles grammar rules into:

1. Packets of code that perform the three functions of syntax checking, error message composition and error recovery.

These methods are explained in detail below.

2. Data or tables that describe key relationships between symbols defined in the grammar rules.

These relationships (such as First set, Selection set) are also discussed in detail below where they are seen to be an important part of the encoding method.

An end user invokes (block 160) the compiled application using input that should be consistent with syntax supported by grammar rules. If the input is syntactically incorrect, this is detected by syntax checker 150. Error message composer 140 and error recovery routines 130 then process end user input strings and parsing stack 212 (in FIG. 2) to:

1. Produce messages that indicate:
   a. What is wrong;
   b. What would have been correct;
   c. What has been skipped in the input string; and
   d. What symbols have been assumed to be in the input string that are not already there;
2. Recover from the error by finding the first possible point of resumption in the input string processing and adjusting the parsing stack.

All activities described in this invention for error message composer 140 and for error recovery are handled by code generated by parser generator 120.

Figure 2:
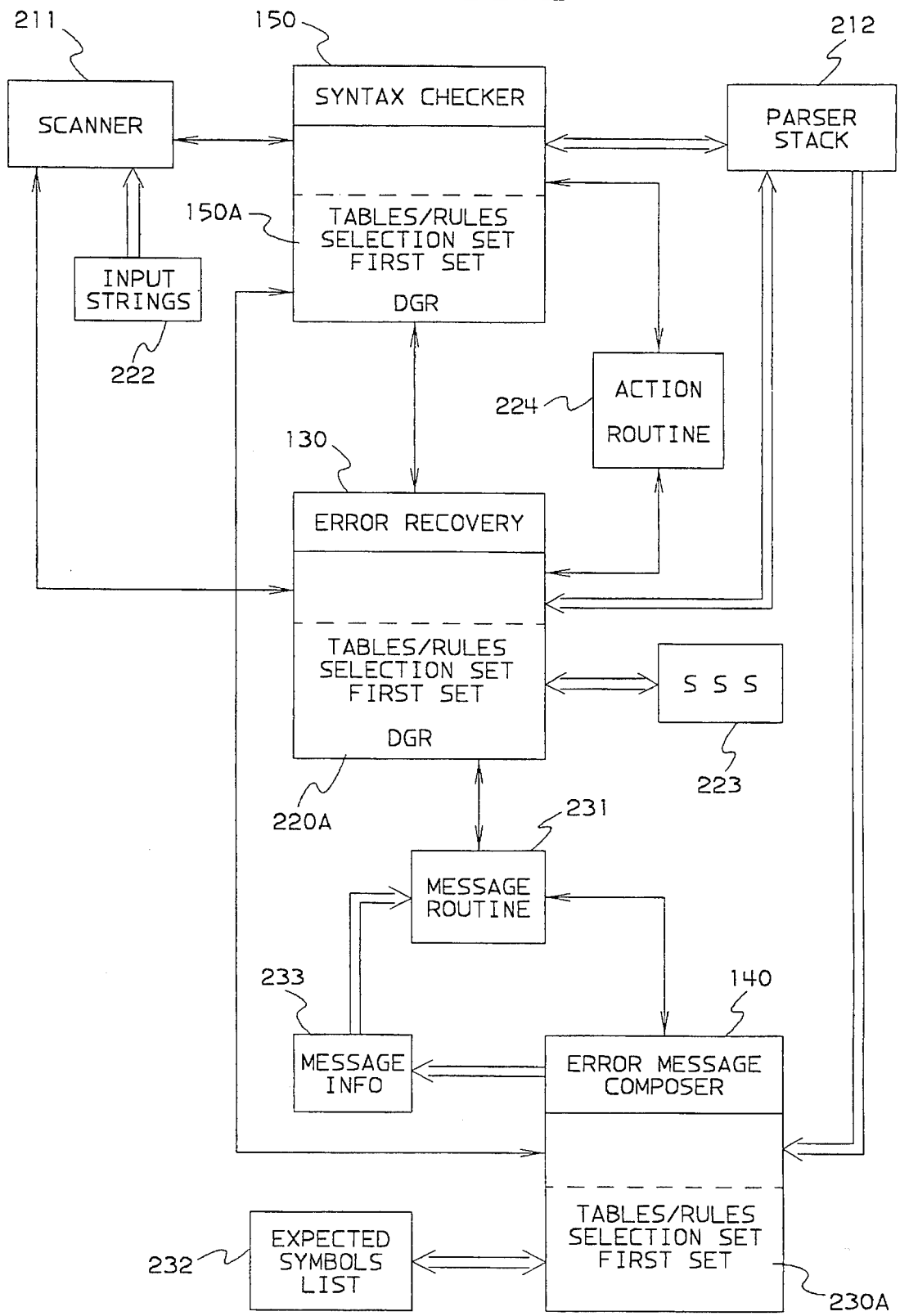
FIG. 2 is a diagram illustrating the detailed interaction between the syntax checker, error recovery and the error message composer.

FIG. 2 describes how the methods of the present invention that are employed in parser generator 120 interact with functions provided by the application and with input provided by the end user of the application. This figure illustrates functions which are significant in terms of the advantages provided by the present invention.

Syntax checker 150 compares the elements in input string 222 provided by the end user with this transformed and tabular representation of grammar rules, which parser generator 120 integrates into the code when it generates the syntax checker, the error recovery routine, and the error message composer.

The application provided Lexical Analysis Routine (Scanner 211) identifies tokens in input string 222. It reads the input one character at a time, dividing input into a sequence of tokens. Each token represents a sequence of characters that can be considered a logical entity. Such processing is well known in the art.

Syntax checker 150 parses each token in the input string using the grammar rules which determine what grammar rules are added (push) to parsing stack 212 when a new keyword is recognized by the scanner. A successful match of a symbol in the input string and the parsing stack results in the deletion of a grammar symbol (pop) from parsing stack 212.

When syntax checker 150 detects an error, it calls error message composer 140 and error recovery routine 130.

Error message composer routine 140 performs the following.
1. It uses grammar information in tables 230A that are created by parser generator 120 and current time of error contents of the parsing stack to dynamically construct lists of expected symbols 232.
2. It then invokes either application provided message routines 231 or parser generator 120 provided message routines 231 with message information 233 which identifies what symbols are found in the input string and what symbols are expected.

Error recovery routine 130 performs the following:
1. It dynamically creates a Set of Synchronizing Symbols (SSS) 223 using the tables of symbol relationships 220A generated by the parser generator 120.
2. It uses the SSS and the time-of-error contents of the parsing stack 212 to adjust the input string to the first symbol where it is possible to resume parsing.
3. It then uses tables 220A and the time-of-error parser stack 212 to adjust the parsing stack.
4. If input is skipped or symbols are assumed, it issues a message to indicate what input is skipped and what symbols are assumed.

Definitions

Several terms used in the invention description below are briefly defined. These definitions are merely intended as explanations to better assist readers in understanding the invention.

Terminal symbol
A basic symbol from which strings in the language are composed. The word "token" is a synonym for "terminal".

Nonterminal symbol
A special symbol denoting sets of strings. Each nonterminal symbol has one or more grammar rules associated with it that describe what sets of strings the nonterminal symbol can represent.

Action symbol
A symbol denoting an action routine that accomplishes some action that is required. In compilers, this is often a semantics routine.

Grammar symbol
Any one of the above defined symbols.

Attribute
A value associated with a grammar symbol. One or more attributes can be associated with a given grammar symbol. An attribute is meant to hold information regarding a grammar symbol and can represent a pointer, number, type or whatever the designer chooses.

Grammar rule
This is one rule of a grammar. It defines how nonterminal symbols may be replaced using nonterminal, terminal and/or action symbols (or even no symbols).

First set
An important concept for the discussion that follows is that of the First set. To compute the set FIRST(X) for all grammar symbols X, apply the following rules until no more terminal symbols can be added.
1. If X is a terminal symbol then set FIRST(X) is {X}
2. If X is a nonterminal symbol and the grammar contains a rule of the form $X=\alpha\beta$ and $\alpha$ is a terminal symbol (and $\beta$ is an arbitrary string of terminal, nonterminal, or action symbols), then add $\alpha$ to the set FIRST(X).
3. If $X = A_1 A_2 \ldots A_k$ is a rule of the grammar, while $A_i$ is a nonterminal symbol and all preceding symbols are nonterminal symbols that are nullable, add set FIRST($A_i$) to set FIRST(X) (in the set union sense of addition).

Nullable
A nonterminal symbol is nullable if it can be validly replaced by the empty string.

< >
The angle brackets, < >, around a symbol indicate that a symbol is a nonterminal symbol. Curly brackets, { }, indicate that a symbol is an action symbol. No brackets indicate a terminal symbol.

Assumed symbol
A symbol that was assumed to be in the input so as to enable recovery from a syntax error.

End-of-input indicator
A token which indicates to the parser or error recovery routine that the end of user input has been reached.

Bottom-of-stack indicator
A symbol that is in the bottom of the parsing stack that is used to indicate the bottom of the parsing stack. This symbol must match the end of input indicator, since this match is used to indicate successful completion of parsing.

Local_top
When the stack is being treated as read only (i.e. the contents of the stack are not changed), then the read is accomplished by moving a top-of-stack index that is local to the error message processing. Since the top-of-stack index is local to the error message processing, the top-of-stack index for the parsing stack remains unchanged, as does the contents of the parsing stack. The error message local top-of-stack index is abbreviated to the term local_top.

Follow set

A Follow set for a given nonterminal symbol <X> is composed of all terminal symbols that can immediately follow an example of <X> in an acceptable input sequence.

To compute the Follow set for nonterminal <X>, apply the following rules until nothing can be added which fits the Follow set criteria.

1. Put an end-of-input indicator in the follow set of the starting nonterminal symbol.
2. If there is a rule <X>=α<Y> β, then all terminal symbols in the First set of β are put into the Follow set of <Y>(α and β are arbitrary strings of terminal, nonterminal, action symbols).
3. If there is a grammar rule <X>=α<Y>, then all terminal symbols in the Follow set of <X> are included in the Follow set of <Y>.

Selection sets

Selection sets are calculated on a grammar rule basis. For a given grammar rule of the form <X>=α, where α is a string of terminal and nonterminal symbols, the Selection set of (<X>=α) is the First set of α if α is nullable, and the Selection set of (<X>=α) is the union of the First set of α and the Follow set of <X> if α is nullable.

Error message composer

An experienced end user can often determine the cause of a problem without a message if the point of error is shown to him. An end user new to a language requires the best information available. It is this type of user whom the error message composer addresses.

Error message composer points out in a user's syntax, and also determines all possible symbols that could be correctly substituted in the position of the error, and proposes only correct symbols.

The parsing stack typically contains the best information about what symbol should appear at the error point.

The present invention not only uses the First set of the top-of-stack symbol, but also the First sets which are associated with symbols below the top-of-stack whenever each symbol above is nullable.

The result is a complete list of proposed solutions in the expected symbols list which contains only correct possibilities. This is followed by messages that show what course error recovery takes. These messages generally provide further indicators to the nature of the syntax error.

Figure 4:
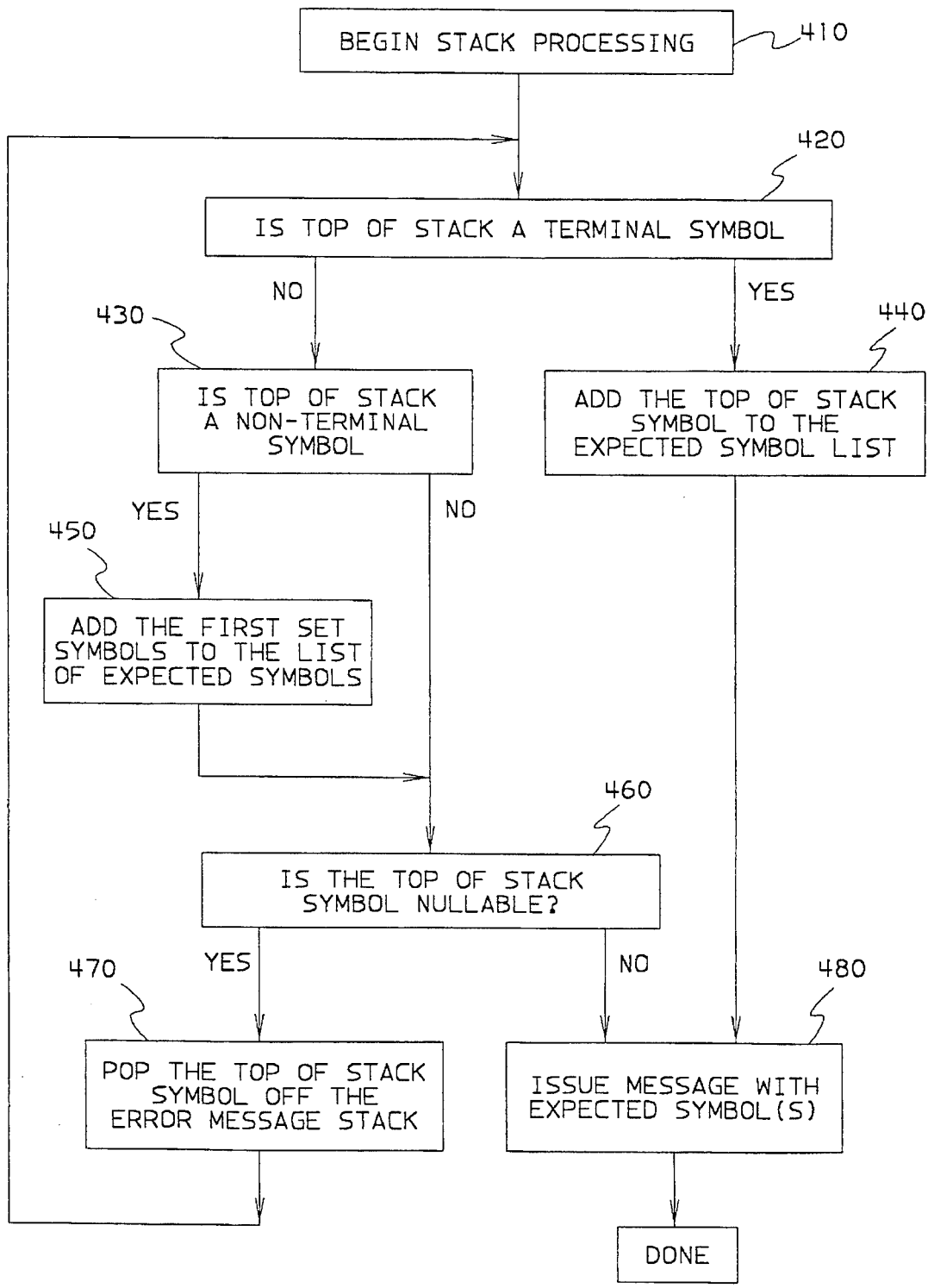
FIG. 4 is a block diagram illustrating error message composer processing.

FIG. 4 describes the process of error message composing.

In this situation, the parsing stack is read but not changed. The top-of-stack symbol referred to in FIG. 4 and in the following text always refers to the local-top symbol as the stack is read by the error message process. The top-of-stack symbol for the parsing stack is not changed by processor 410.

First determine 420 if the local-top symbol on the error message stack is a terminal symbol.

If the top-of-stack symbol is not a terminal symbol, then it is checked 420 to see if it is a nonterminal symbol. The only other alternative is that it is an action routine.

When the top-of-stack symbol is a terminal symbol, it is added 440 to the list of expected symbols. The expected-symbols-list is a list of terminal symbols that show what input could be valid at the point of error.

A test is made 430 to see if it is a nonterminal symbol. When the top-of-stack symbol is a nonterminal symbol, then add 450 all symbols in the First set of that nonterminal symbol to the expected-symbols-list. The First sets for nonterminal symbols are one of the tables that the parser generator generated at "first compile" time.

The top-of-stack symbol is either a nonterminal symbol or an action routine. All action routines are considered nullable. A nonterminal symbol is considered nullable if it can validly be replaced by nothing (the empty or null string). To find all nullable nonterminals (block 460), apply the following rules until no more nullable, nonterminal symbol are found.

1. A nonterminal symbol is nullable if there is a grammar rule in the grammar of the form:

<X>=ε where ε indicates the null or empty string.

2. A nonterminal symbol is also nullable if there is a grammar rule in the grammar for that nonterminal symbol that has only nullable nonterminal symbols on its right hand side.

The stack index for the error message parser stack is decremented so as to point to the next symbol below the current top-of-stack symbol. This 'pops' (block 470) the local top-of-stack symbol off the error message stack. Thus, the stack index is decremented once for the symbol itself, and once for every attribute immediately below that symbol on the stack.

A message is issued by either a message routine provided by parser generator 120 or by an application provided routine (block 231). It indicates what symbol was seen (as well as line number, position in line, etc.) what symbol or symbols were expected 480, and the line in error.

There are two possibilities for a message:

1. There is one symbol fin the list of expected symbols.
2. There is more than one symbol in the list of expected symbols.

A different message results for the two cases so as to accommodate the correct phrasing of the message:

1. Error on line nn in position ii, xxxxx was expected before yyyyy.
2. Error on line nn in position ii, yyyyy was seen where one of (xxxxx, zzzzz . . . ) was expected.

In the messages above, xxxxx and zzzzz are entries in the list of expected symbols, and yyyyy is the symbol that was detected at the point of error.

Error recovery process

Figure 3:
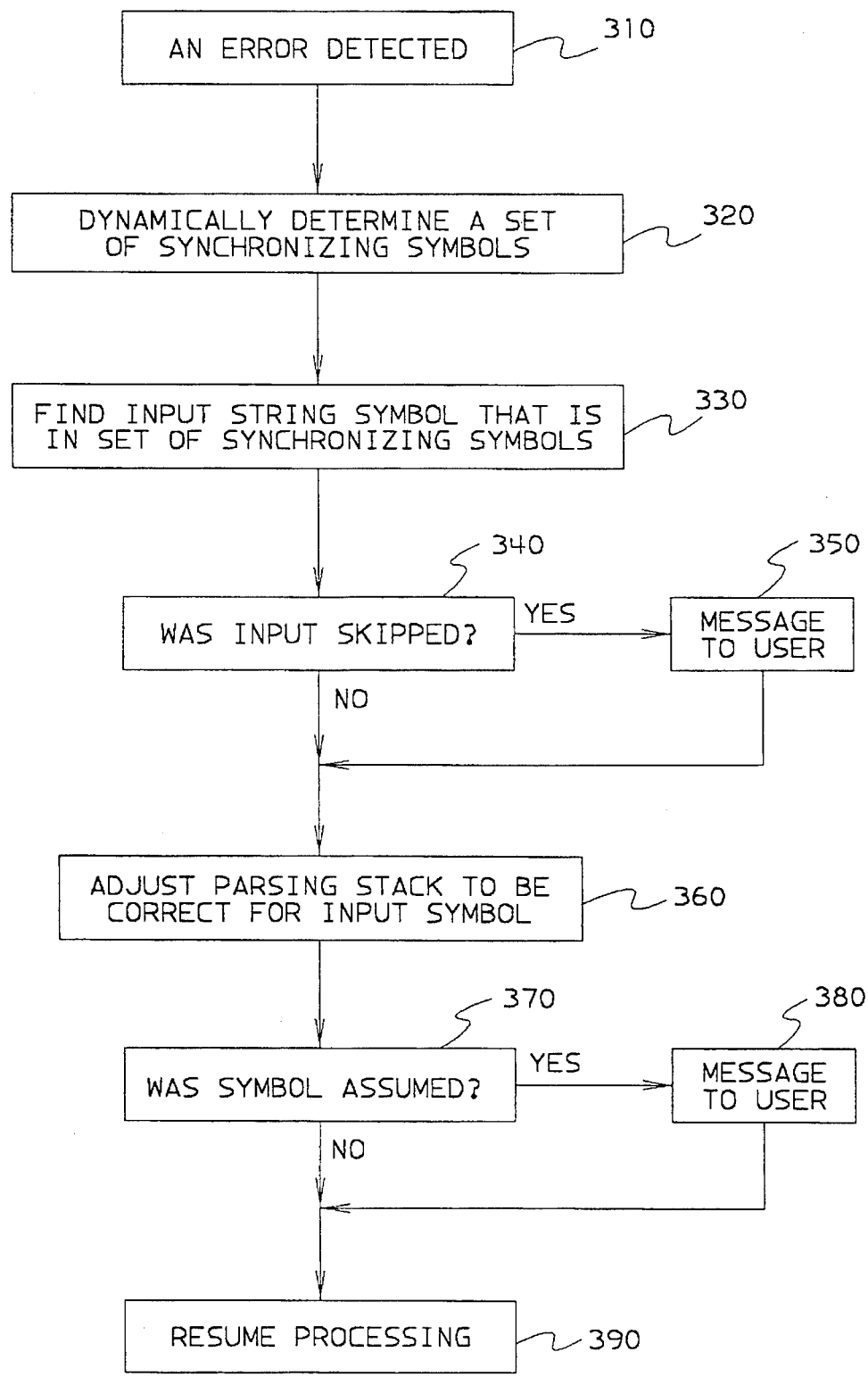
FIG. 3 is a block diagram illustrating error recovery processing.

FIG. 3 describes the error recovery process.

In recovering from a syntax error, the present process locates the position of the error, corrects the error, revises (adjusts) the current configuration (position within the input string and the parsing stack) and resumes parsing. Also:

1. It reports the presence of an error clearly and accurately.
2. It recovers quickly enough to detect subsequent errors.
3. There is no slow down in the processing of correct programs.
4. It reports all pertinent information on how error recovery is accomplished.

Error recovery begins with the detection 310 of an error. The stack is at a point where the input is not in the Selection set for top-of-stack symbol. The Selection set is generated by the parser generator from the original grammar rules. The challenge is in adjusting the input string and/or the parsing stack to recover at some point which allows normal parsing to continue.

Figure 5:
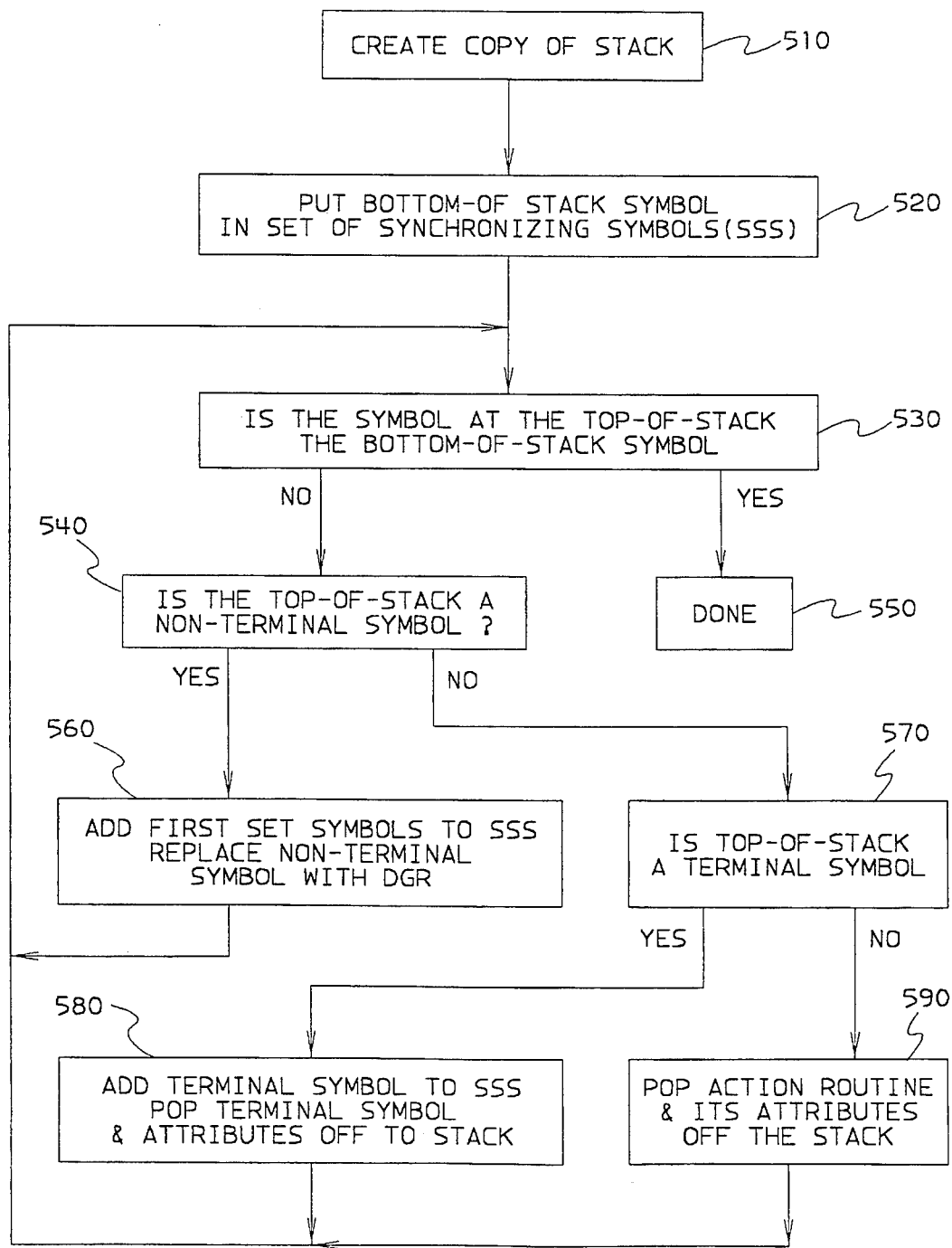
FIG. 5 is a block diagram illustrating the process for dynamically determining a set of synchronizing symbols.

The approach taken in this automated method is first to determine 320 a set of synchronizing symbols (SSS) and then make an intelligent selection of the one of them that allows recovery from error. FIG. 5 describes how an SSS is dynamically determined.

Adjusting the input string

When a set of synchronizing symbols is built, the input stream is scanned 330 for the first input symbol that is also in the set of synchronizing symbols. This becomes the current input symbol. A symbol is always found since the bottom-of-stack indicator always is in the set of synchronizing symbols and it matches the end-of-input indicator. Any input which does not allow recovery is skipped 340.

When an appropriate input symbol is found, and if some input is skipped, then a message that input was skipped is issued 350. The message indicates "Input was skipped up to xxxxx". "xxxxx" is the symbol in the input string where parsing is resumed. A line number, and position within the line, may also be part of the message.

Error recovery process (continued)

The original parsing stack is now manipulated 360 to where it matches the symbol in the adjusted input string. The process that adjusts the parsing stack is discussed below.

If a token is needed when adjusting the stack (implying that the list of assumed symbols is not empty 370) then a message is issued 380 and the symbols which are assumed are inserted in the message in the order in which they are assumed (e.g. "xxxx was assumed before the error point").

Control is returned 390 to parser to continue normal parsing with the parsing stack and input string in the correctly adjusted position.

Dynamic Determination of Synchronizing Symbols

FIG. 5 describes the process of how the SSS is determined.

At the time of error a local copy of the parse stack is made 510. This local stack is then processed to dynamically determine a set of synchronizing symbols (SSS).

An SSS is dynamically derived from the symbols that are currently on the parsing stack. The SSS represents the set off symbols that can possibly occur in the input string for the subset of symbols that are currently on the parsing stack. The goal of using the SSS is to find the first symbol in the input string that can validly follow the input which is already parsed, and allows parsing to subsequently continue. The worst case situation occurs when the end-of-input indicator is encountered and it matches the bottom-of-stack indicator.

Designated Grammar Rule (DGR)

For each nonterminal symbol in the grammar, one grammar rule is designated for use in gathering synchronizing symbols (see block 560). With a parser generator, this designation can be implicit from the user's grammar. In this invention, the last grammar rule for a given nonterminal symbol is considered the designated grammar rule. The last grammar rule is used because there is a tendency for null productions to appear last among grammar rules for a given nonterminal symbol. Null grammar rules are usually a good choice for the designated grammar rule. When the stack is processed in this phase, the designated grammar rule is always used to manipulate the stack. The selection of which grammar rule to designate is not important to achieve good error recovery. It is only necessary to designate one rule which does not cause error recovery to loop indefinitely. All designated grammar rules must be able to resolve to terminal symbols using only designated grammar rules. Otherwise, sooner or later, the error recovery would loop indefinitely. The simplest example of this would be designating a grammar rule which mentions itself on its right side.

Designated grammar rules are checked by parser generator 120 to determine if error recovery loops. The following rules are applied only to DGRs until no more nonterminal symbols can be marked as acceptable:

1. All nonterminal symbols having no nonterminal symbols on the right stand side are marked acceptable;
2. All nonterminal symbols having only terminals or acceptable nonterminal symbols on the right hand side are marked acceptable;
3. When no more nonterminal symbols can be found acceptable, those nonterminal symbols that are still not marked acceptable cause looping.

Parser generator 120 uses the above method to check for looping and issues a message if any grammar rules cause looping in error recovery.

Dynamic Determination of SSS (continued)

The end-of-input indicator is always in the SSS (step 520). This allows for a match between the bottom-of-stack symbol and the end-of-input indicator. Therefore, error recovery is always successful.

When the top-of-stack symbol is the bottom-of-stack indicator there are no more synchronizing symbols to gather. This is tested in block 530. In this case, the process to dynamically build the SSS for the current error is completed (block 550). The next step occurs in the error recovery process (block 330).

There are three possible types for the top-of-stack symbol. They are processed according to their type in the following ways:

1. nonterminal symbols- nonterminal symbols on top of the stack are simply replaced (see block 560) with the right side of the designated grammar rule. When a nonterminal is seen (step 540), all terminal symbols in the First set of that nonterminal symbol are entered into the set of synchronizing symbols.
2. Terminal symbols-If a terminal symbol is seen (step 570), that symbol is entered into the set of synchronizing symbols and the terminal symbol and its attributes are popped off the stack (step 580).
3. Action symbols-Action symbols and their attributes are popped off the stack (step 590).

This process continues until the stack is emptied (step 530 and 550).

Adjusting the Parsing Stack

Figure 6:
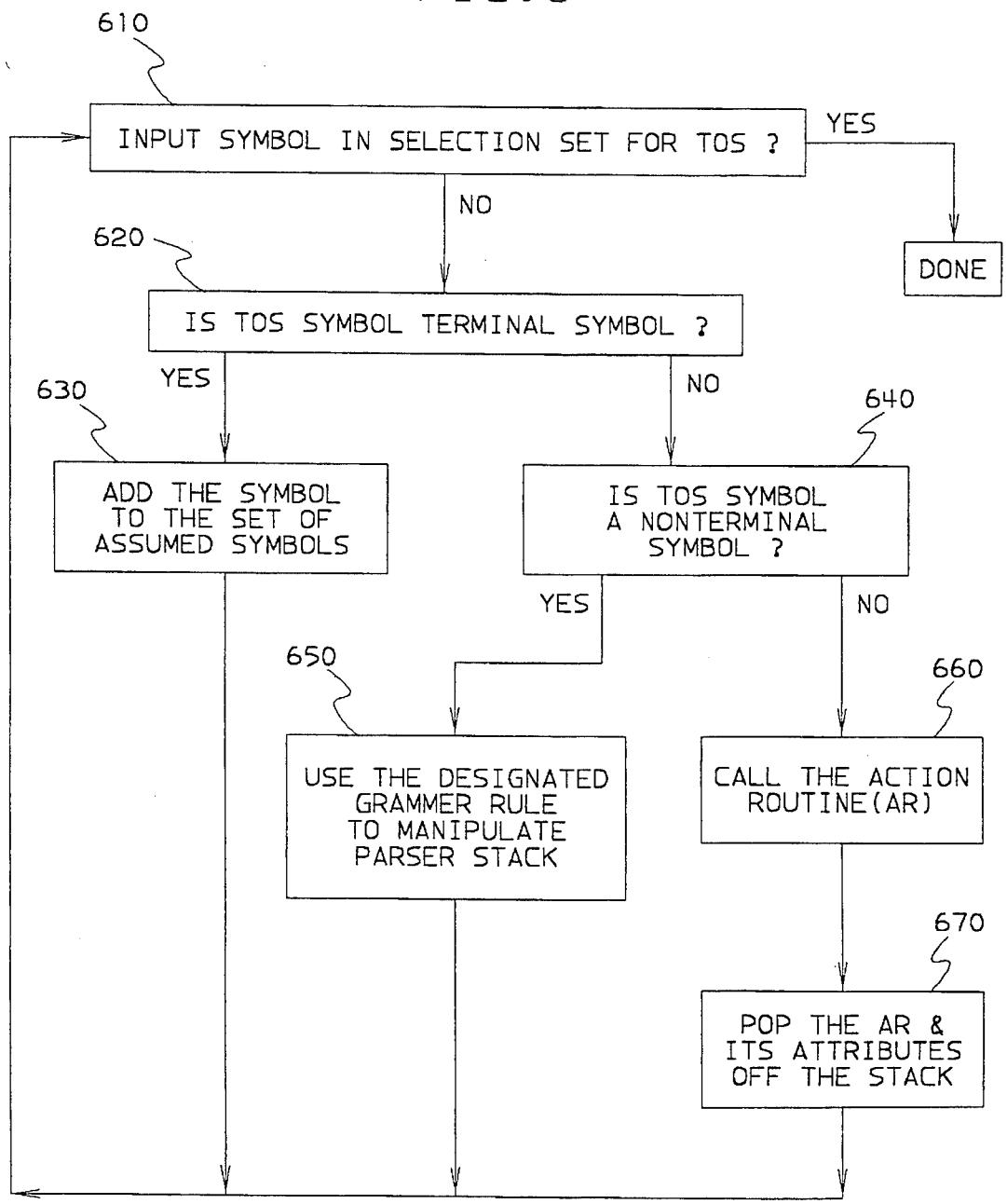
FIG. 6 is an illustration of the process of adjusting the parsing stack to a symbol where parsing can resume after an error.

FIG. 6 describes this process in more detail.

The original stack is now manipulated to where the selected input is correct. If the selected input is in the selection set for the top-of-stack symbol, then recovery is complete and normal parsing can resume. If not, then that symbol is added to a list of assumed symbols. If the top-of-stack symbol is a nonterminal symbol, then the Designated Grammar Rule (DGR, discussed previously) is used to manipulate the stack.

The selected input symbol is compared 610 to the members of the selection set for top-of-stack (TOS) symbol. The Selection Sets for all grammar rules are derived by parser generator 120 at "first compile" time. Selection sets are defined earlier. If the input symbol is in the Selection set for the top-of-stack symbol, then recovery is complete and normal parsing resumes.

If the input symbol is not in the Selection set for the top-of-stack symbol, and if the top-of-stack symbol is a terminal symbol (see step 620), then that symbol is added (step 630) to the list of assumed symbols, where it is being saved for a later display in a message. Showing the assumed symbols helps users to better see what might have been correct syntax and to understand what correction was made by the error recovery.

The "first compile" user (the application/function designer or developer) has to specify default values for the synthesized attributes (in the symbol definitions). When a terminal symbol is assumed, these default values for the synthesized attributes are put into the appropriate place in the stack. By "appropriate place in the stack" is meant the same place where the attribute value would be placed, if the attribute value is being processed by the generated parsing code.

Interfacing with action routines

When the top-of-stack symbol is neither a terminal symbol nor a nonterminal symbol; then the action routine is called (step 660) (as in normal parsing) and the action routine symbol and the attributes immediately below it in the stack, are then popped off the stack (step 670) (just as would be done in normal parsing after the input symbol matched the top-of-stack symbol).

Attributes are a means of associating information with a grammar symbol. Values for attributes can be computed by action routines or produced by the Lexical analysis (tokenizing) code.

A translation scheme is a grammar in which attributes are associated with the grammar symbols and action symbols (corresponding to action (semantic) routines) are inserted within the right sides of grammar rules. The action symbols are placed in the appropriate position in the right sides of grammar rules to show (and enforce) the order and timing of calls to the action routines represented by the action symbols. It is through the use of action routines and attributes that actual work is performed while parsing input.

In terms of parse trees, a synthesized attribute is one which gets its value from attribute values at the children of the node. An inherited attribute conversely gets its value from the attribute values of the parent of the node.

Attributes may hake any meaning relevant to the user. Terminal, nonterminal and action symbols may have as many attributes as needed. Terminal symbol attributes are synthesized, but nonterminal and action symbol attributes may be either synthesized or inherited.

To ensure that the attributes can be evaluated in an orderly manner, and to avoid circular definitions, the source grammar conforms to certain rules (such as to L-Attributed rules, simple assignment form):

A much more complete discussion on attributes can be found in the textbook *Compiler Design and Theory* by Lewis, Rosenkrantz and Stearns. Also:

1. The only action taken against attributes by the parser is a copy (internal stack move). The action therefore has a source and destination.
2. The only other action taken against attributes is performed by action routines against synthesized attributes.
3. The lexical analyzer typically assigns values to synthesized attributes of terminal symbols.
4. The action taken by a grammar rule is independent of any other grammar rule.
5. The source for an inherited attribute of a given symbol on the right side of a grammar rule is either an inherited attribute of the left side of the grammar rule or a synthesized attribute of the right side.
6. The source for a synthesized attribute on the left-hand side of a given grammar rule must be either an inherited attribute of the left-hand side, or a synthesized attribute of the right hand side.
7. The number and type of attributes associated with grammar symbols is fixed for the entire grammar.

Adjusting the Parsing stack (continued)

If the input symbol is not in the Selection set for the top-of-stack symbol, and if the top-of-stack symbol is a nonterminal symbol (see step 640), then the designated grammar rule for the top-of-stack, nonterminal symbol is used 650 to manipulate the stack. Stack manipulation is similar to what is done in normal parsing. The nonterminal symbol's attributes are handled as normal parsing would be, the nonterminal symbol and its attribute place holders below it in the stack, are popped off the stack. Then all symbols and attributes (if any) on the right side of the designated grammar rule are pushed 650 onto the stack.

The top-of-stack symbol is an action symbol. Action routine 224 is called 660 just as would be done in normal parsing. On return from the routine, the attributes are handled just as is done by normal parsing, and then the Action symbol and its attributes are popped off 670 the stack just as is done in normal parsing.

Error Message Example

Figure 8:
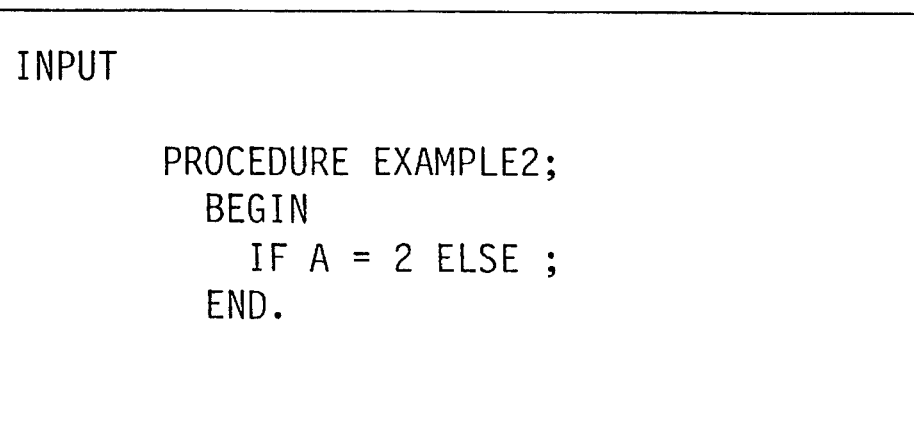
FIG. 8 is a diagram illustrating the input string (with imbedded error) for the example discussed in this invention.

This example uses the grammar defined in Table 1 and uses the example in FIG. 8 as the end user input. In this grammar, the designated grammar rule for a nonterminal symbol is the LAST grammar rule specified for that nonterminal symbol.

Figure 7:
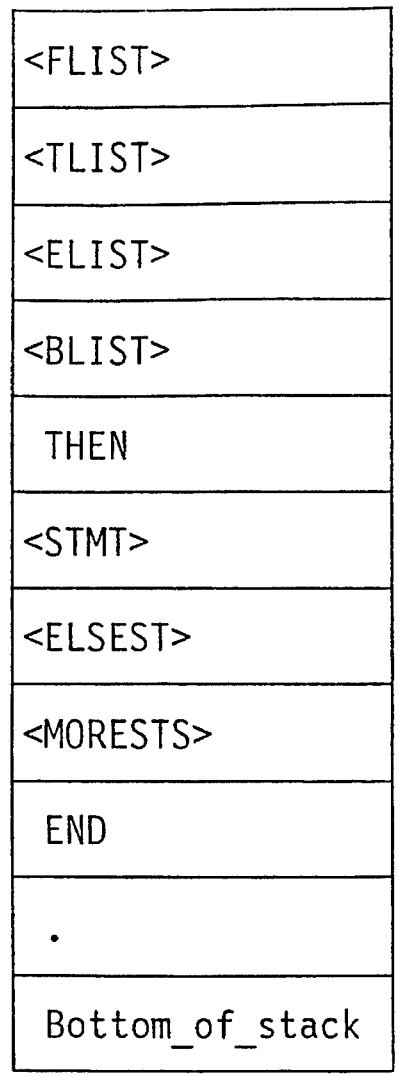
FIG. 7 is a diagram illustrating the state of the parsing stack for the example discussed in this invention.

FIG. 7 describes the contents of the parsing stack at the time the error is detected.

TABLE 1

Grammar Rules for the Examples

| 001 | <PROG> | = PROCEDURE ID ; BEGIN <STMT> <MORESTS> END . |
|-----|--------|-----|
| 002 | <STMT> | = WHILE <EXP> DO <STMT> |
| 003 |        | = ID <LABSTMT> |
| 004 |        | = BEGIN <STMT> <MORESTS> END |
| 005 |        | = IF <EXP> THEN <STMT> <ELSEST> |
| 006 |        | = GOTO ID |
| 007 |        | = FOR ID := <EXP> TO <EXP> DO <STMT> |
| 009 |        | = |
| 010 | <ELSEST> | = ELSE <STMT> |
| 011 |        | = |
| 012 | <LABSTMT> | = := <EXP> |
| 013 |        | = : <STMT> |
| 014 | <MORESTS> | = ; <STMT> <MORESTS> |
| 015 |        | = |
| 016 | <EXP>  | = <ALIST> <BLIST> |

TABLE 1-continued

Grammar Rules for the Examples

| 017 | <BLIST> | = < <ALIST> <BLIST> |
| --- | --- | --- |
| 018 | | = = <ALIST> <BLIST> |
| 019 | | = > <ALIST> <BLIST> |
| 020 | | = |
| 021 | <ALIST> | = − <TERM> <ELIST> |
| 022 | | = + <TERM> <ELIST> |
| 023 | | = <TERM> <ELIST> |
| 024 | <ELIST> | = + <TERM> <ELIST> |
| 025 | | = − <TERM> <ELIST> |
| 026 | | = |
| 027 | <TERM> | = <FACTOR> <TLIST> |
| 028 | <TLIST> | = / <FACTOR> <TLIST> |
| 029 | | = * <FACTOR> <TLIST> |
| 030 | | = |
| 031 | <FACTOR> | = <PRIMARY> <FLIST> |
| 032 | <FLIST> | = | <PRIMARY> <FLIST> |
| 033 | | = & <PRIMARY> <FLIST> |
| 034 | | = |
| 035 | <PRIMARY> | = NUMBER |
| 036 | | = ( <EXP> ) |
| 037 | | = ID |

To compose the error message, it is necessary to READ the parsing stack, gathering a set of expected symbols as you go. The local_top is used as an index into the stack by the error message composing routine. The top-of-stack indicator used by the parser, and the parsing stack itself, are not affected by this error message composing process.

The following steps are taken to compose the message:
1. At the time of error, the top-of-the stack holds <FLIST>. All symbols in the First set of <FLIST> are added to the set of expected symbols (es={|&}). Since <FLIST> is nullable, that symbol is poped off the stack (by changing the value of local_top).
2. Now local_top indicates that <TLIST> is on top of the stack. All symbols in the First set of <TLIST> are added to the set of expected symbols (es={|&/*}). Since <TLIST> is nullable, that symbol is popped off the stack.
3. Now local_top indicates that <ELIST> is on top of the stack. All symbols in the First set of <ELIST> are added to the set of expected symbols (es={|&/*+−}). Since <ELIST> is nullable, that symbol is popped off the stack.
4. Now local_top indicates that <BLIST> is on top of the stack. All symbols in the First set of <BLIST> are added to the set of expected symbols (es={|&/*+−<=>}). Since <BLIST> is nullable, that symbol is popped off the stack.
5. Now local_top indicates that THEN is on top of the stack. All symbols in the First set of THEN are added to the set of expected symbols (es={|&/*+−<=>THEN}). Since THEN is NOT nullable, the collection of expected symbols is complete.

Now a message is issued to show what was wrong and what would have been correct. It is best to repeat the line in error in the message, and to indicate where in the line the error occurred. The message would look like:

IF A = 2 ELSE ;
            |
Error on line 3 position 13: ELSE was seen where one of -continued

{|&/* + − < = > THEN} would have been correct.

Error recovery example

This example uses the grammar defined in Table 1 and uses the example in FIG. 8 as the end user input. In this grammar, the designated grammar rule for a nonterminal symbol is the LAST grammar rule specified for that nonterminal symbol.

FIG. 7 describes the contents of the parsing stack at the time the error is detected.

Dynamically determining SSS

The first step in the error recovery process is to dynamically determine the set of synchronizing symbols. The following steps are executed to accomplish this:
1. The top-of-stack symbol is <FLIST>. The First set symbols for <FLIST> are added to the set of synchronizing symbols (SSS={|&}). The designated grammar rule for <FLIST>(34) is used to manipulate the stack, resulting in popping <FLIST>.
2. The top-of-stack symbol is now <TLIST>. The First set symbols for <TLIST> are added to the set of synchronizing symbols (SSS={|&/*}). The designated grammar rule for <TLIST>(28) is used to manipulate the stack, resulting in popping <FLIST>.
3. The top-of-stack symbol is now <ELIST>. The First set symbols for <ELIST> are added to the set of synchronizing symbols (sss={|&/*+−}). The designated grammar rule for <ELIST> (24) is used to manipulate the stack, resulting in popping <ELIST>.
4. The top-of-stack symbol is now <BLIST>. The First set symbols for <BLIST> are added to the set of synchronizing symbols (SSS={|&/*+−<=>}). The designated grammar rule for <BLIST> (20) is used to manipulate the stack, resulting in popping <BLIST>.
5. The top-of-stack symbol is THEN. That symbol is then added to the set of synchronizing symbols (SSS={|&/*+−<=> THEN}). The THEN symbol is popped off the stack.
6. This process continues until reaching the BOTTOM_OF_STACK. The resulting set of synchronizing symbols is {|&/*+−<=>THEN WHILE ID BEGIN IF GOTO FOR ELSE END END_OF_INPUT}.

Adjusting the input string

The next step in the error recovery process is to scan the input stream to find the next symbol that is in the set of synchronizing symbols. The input symbol seen that caused the error to be detected was 'ELSE'. Since that symbol is in the set of synchronizing symbols, there is no need to skip any input, so parsing resumes with that symbol.

Adjusting the parsing stack.

The parsing stack is then adjusted, using the designated grammar rules until the current input symbol (after adjusting the input) is in the selection set of the top-of-stack symbol. The following steps are involved in adjusting the parsing stack.

1. The top-of-stack symbol initially is <FLIST>. Since the current input symbol is not in the selection set of <FLIFTS>, the designated grammar rule for <FLIST> is used to manipulate the stack. Using the designated grammar rule causes this symbol to be popped off the stack. The same action is taken for <TLIST>, <ELIST>, and <BLIST>.

2. Now THEN is on top of the Stack. The terminal symbol THEN is saved in the set of Assumed Symbols, and his symbol is popped off the stack.

3. This leaves the nonterminal symbol <STMT> on top of the stack. The current input symbol (ELSE) is not in the selection set for <STMT> so <STMT> is popped off the stack by applying the designated grammar rule for <Stmt>

4. Now the top-of-stack symbol is <ELSEST>. The current input symbol (ELSE) IS in the selection set for <ELSEST>, so no more adjustments are made to the stack, parsing can continue with the current configuration of the stack and input.

5. A message is issued when input is skipped, to tell the input writer what input was skipped (i.e. where parsing resumed). Since no input was skipped, no message is issued.

6. A message is issued to indicate what symbols were assumed. In this case, only the symbol THEN was assumed. The message would look like:
   THEN was assumed before the error point.

Recovery is now complete so normal parsing can continue.

In summary, the present invention provides a method for checking syntax in the command structure associated with the MVS Operating System designed for use in hardware environments marketed and sold by the assignee of the present invention. In addition to checking the syntax for MVS operating system commands, syntax checking is also usefully provided for the parsing of parameter list (PARMLIB) library members. The syntax is supplied in accordance with the present method by operating system developers who specify the desired syntax in an appropriate format, typically in a form similar to the well known Backus-Naur Form (BNF). Thus a significant benefit is that the operating system designer is freed from the necessity of developing code that:

1. identifies all the situations that require error messages;

2. produces accurate, understandable, meaningful, and consistent error messages;

3. provides intelligent recovery (resumption of parsing) when syntax errors are detected.

These messages are in fact produced in response to a syntax error recognized by code which is generated in accordance with the present invention. Accordingly, the present invention significantly extends the range, scope and utility of so-called compiler generators, error message composers, and error recovery routines; to significantly ease the burden on operating system designers.

While the invention has been described in detail herein in accord with the certain preferred embodiments thereof, many modifications and changes therein may be effected by those skilled in the art. Accordingly, it is intended by the appended claims to cover all such modifications and changes as fall within the true spirit and scope of the invention.

APPENDIX

LL(1) Parsers

This is a discussion, in very general terms, of how an LL(1) parser works. It is included to enhance the background understanding of the reader.

The parser has input, a stack, and a table used to determine the parser's next action in dependence on a supplied input signal stream. The input to the parser is the string to be parsed. The stack contains a sequence of grammar symbols. The table is a two dimensional array $A(x,y)$ where x is a nonterminal symbol and y is a terminal symbol. The table contains pointers to procedures for valid combinations of x and y, and an error indicator otherwise.

The stack initially contains the start symbol of the grammar preceded by a bottom-of-stack marker.

The action taken by the parser is determined by the combination of the input symbol and the symbol on top of the stack. There are four possibilities:

1. If the top-of-stack symbol is a terminal symbol and that symbol equals the input symbol, then the symbol is popped off the stack. If they are not equal, then an error has been detected. The parser should call an error message routine and then an error recovery routine, to adjust the stack or input, to allow parsing to continue.

2. If the top-of-stack symbol is a nonterminal symbol, then the table is consulted. If the table contains the address of a procedure, then that procedure is executed to modify the stack according to the rule of the grammar that correlates to the procedure. If the table does not contain a procedure address, then it contains an error indicator and the parser calls an error message routine and then an error recovery routine.

3. If the top-of-stack symbol is an action symbol, then the action routine is called with its attributes being parameters to that action routine.

4. If the end of input has been reached and the top-of-stack symbol is the bottom-of-stack marker, then parsing has been successfully completed.

Prefix property

LL(1) and LR(1) parsers have the "prefix property". They detect an error as soon as input has been seen for which there is no valid way to continue. This is the earliest time a parser can correctly determine an error.

Performing error recovery and error message processing with parsers that do not have the prefix property is usually more difficult and less effective.

The invention claimed is:

1. A method for dynamically producing a set of synchronizing symbols, said method comprising the steps of:

creating a copy of a parsing stack, said parsing stack being produced by a parser operating consistently with a set of grammar rules to create said stack;

adding a bottom of stack indicator to the set of synchronizing symbols;

scanning said stack to determine if the symbol at the top of the stack is the bottom of stack indicator and terminate synchronizing symbol accumulation if it is, otherwise, continue processing by:

determining if the symbol at the top of the stack is a nonterminal symbol in said grammar and, if so, adding First set symbols associated with said top of stack symbol to said set of synchronizing symbols and replacing said nonterminal symbol on said stack in accordance with a designated grammar rule for it, and continuing processing at said scanning step, but if said top of stack symbol is not a nonterminal symbol, continue processing by:

determining if said top of stack symbol is a terminal symbol in said grammar and, if so, adding said terminal symbol to said set of synchronizing symbols and removing said terminal symbol from said stack and continuing processing at said scanning step, but if said top of stack symbol is neither a terminal symbol nor a nonterminal symbol, continue processing by:

removing said neither terminal nor nonterminal symbol from said stack and continue processing at said scan step.

2. The method of claim 1 in which the roles of said stack and said stack copy are reversed.

3. A method for dynamically producing a set of synchronizing symbols, said method comprising the steps of:

scanning down a parsing stack using top of stack symbols to determine which symbols to add to the set of synchronizing symbols, said stack being produced by a parser operating consistently with a set of grammar rules to create said stack;

modifying the stack in response to a top of stack symbol and a designated grammar rule such that the top of stack symbol is removed from the stack and the designated grammar rule is added to the stack; and terminating said scanning and modification upon encountering a bottom of stack symbol in said stack.

* * * * *